C. C. WILLIAMS.
POWER TRANSMISSION MECHANISM.
APPLICATION FILED OCT. 2, 1920.
1,424,542.
Patented Aug. 1, 1922.
4 SHEETS—SHEET 1.
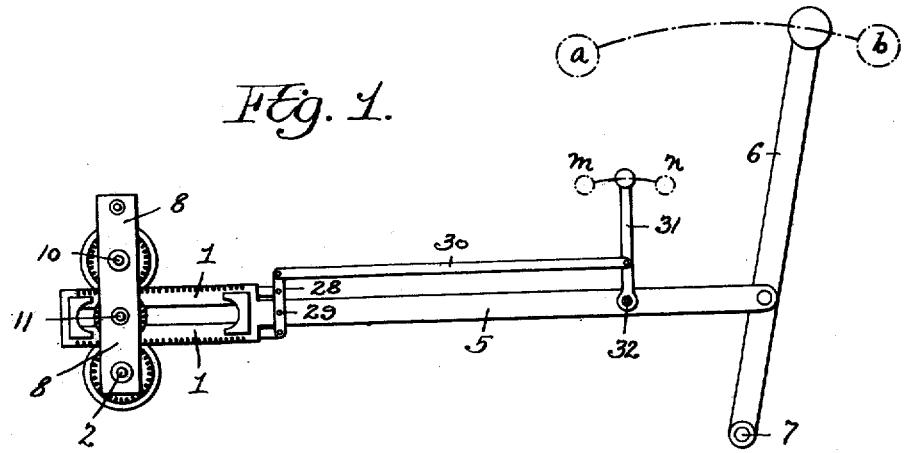
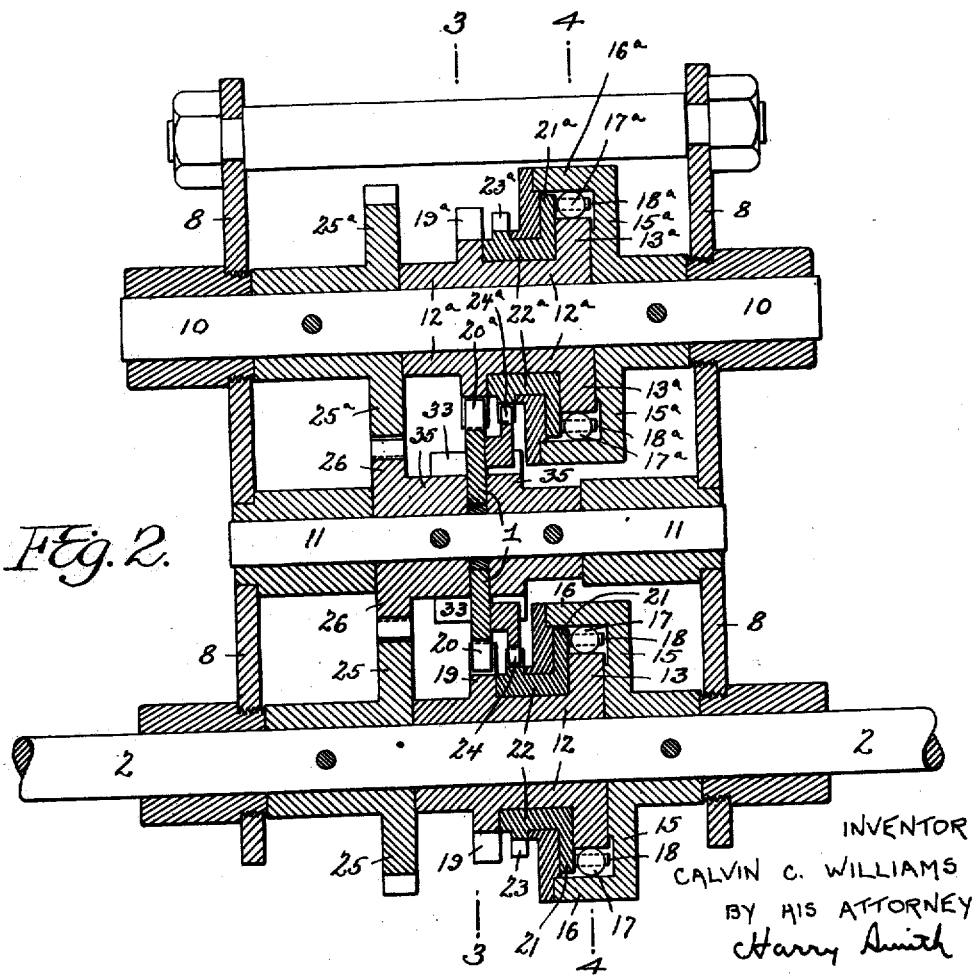
INVENTOR
CALVIN C. WILLIAMS
BY HIS ATTORNEY
Harry Smith

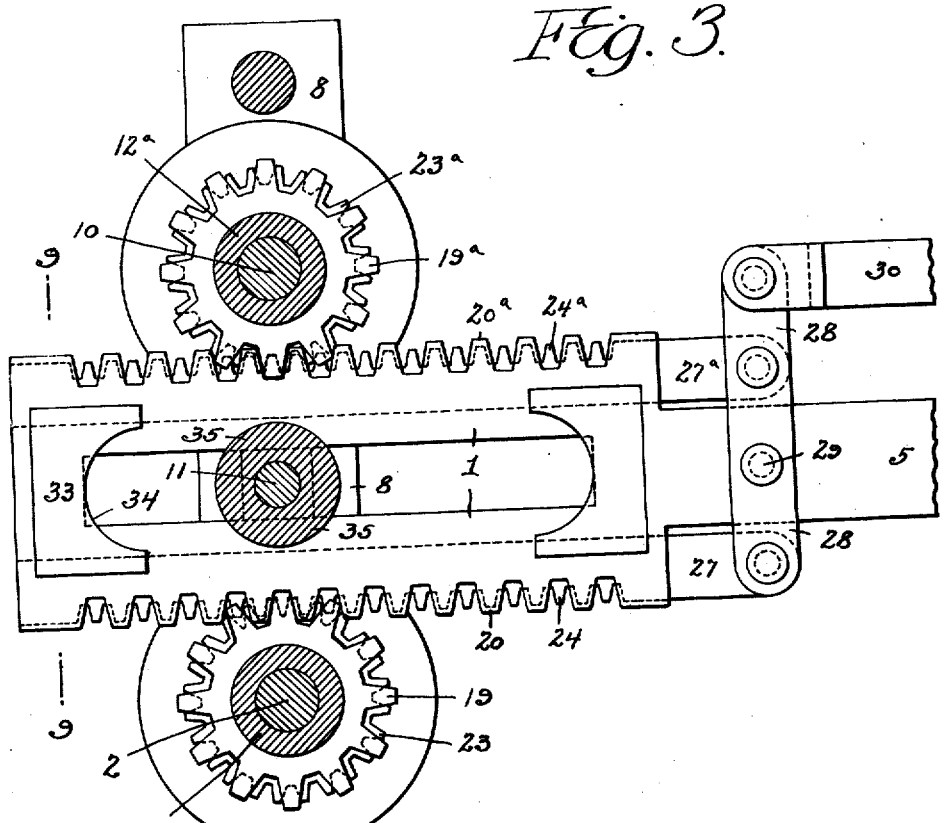
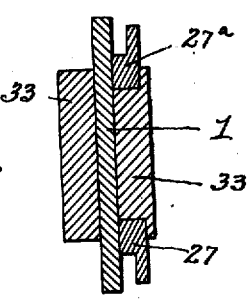

C. C. WILLIAMS.
POWER TRANSMISSION MECHANISM.
APPLICATION FILED OCT. 2, 1920.

1,424,542.

Patented Aug. 1, 1922.
4 SHEETS—SHEET 3.

INVENTOR
CALVIN C. WILLIAMS
BY HIS ATTORNEY
Harry Smith

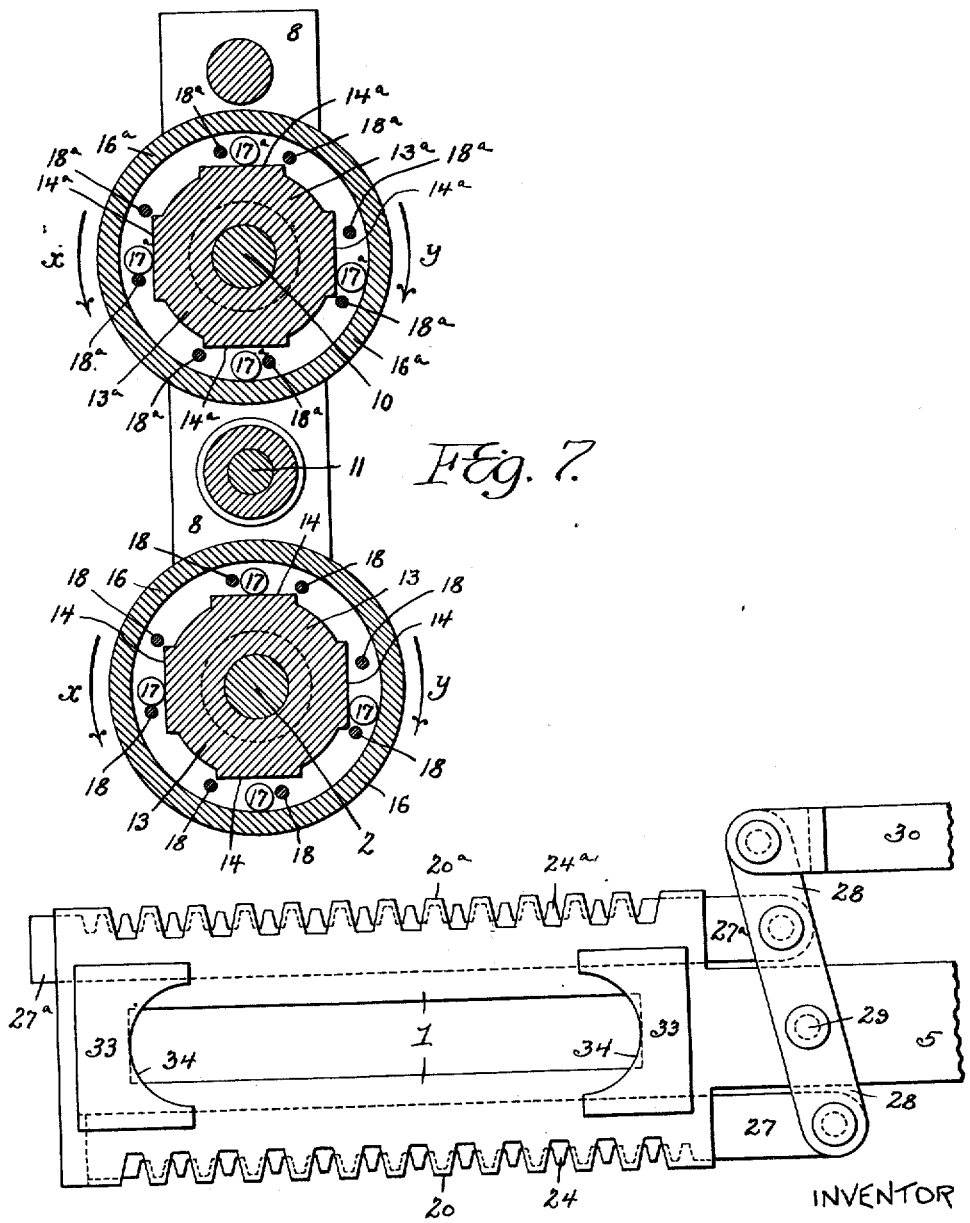

UNITED STATES PATENT OFFICE.

CALVIN C. WILLIAMS, OF PHILADELPHIA, PENNSYLVANIA.

POWER-TRANSMISSION MECHANISM.

1,424,542.

Specification of Letters Patent. Patented Aug. 1, 1922.

Application filed October 2, 1920. Serial No. 414,243.

*To all whom it may concern:*

Be it known that I, CALVIN C. WILLIAMS, a citizen of the United States, residing in Philadelphia, Pennsylvania, have invented certain Improvements in Power-Transmission Mechanism, of which the following is a specification.

My invention relates to power transmission mechanism such as is used for the purposes of changing reciprocating movement into rotary movement, the objects of my invention being to construct mechanism of this type in such a way that the vibratory movement of the reciprocating element may be changed into continuous movement in either direction of the rotary element, that cessation of movement of the reciprocating element may permit the rotary element to continue its rotation, and that the stationary reciprocating element may be caused to act as a brake upon the rotary element. These objects I accomplish in the manner hereinafter set forth, reference being had to the accompanying drawings, in which—

Fig. 1 is a side elevation, diagrammatic in nature, of power transmission mechanism constructed in accordance with my invention, a swinging handle being illustrated as the actuating medium for the reciprocating element;

Fig. 2 is a vertical transverse sectional view of the transmission mechanism;

Fig. 3 is a vertical longitudinal sectional view on the line 3—3, Fig. 2;

Fig. 7 is a view similar to Figs. 4 and 5, but with the parts adjusted to "rearward drive" position;

Fig. 8 is a view similar to Fig. 6 but with the parts adjusted to "rearward drive" position, and Fig. 9 is a vertical transverse sectional view on the line 9—9, Fig. 3.

Figures 4, 5:
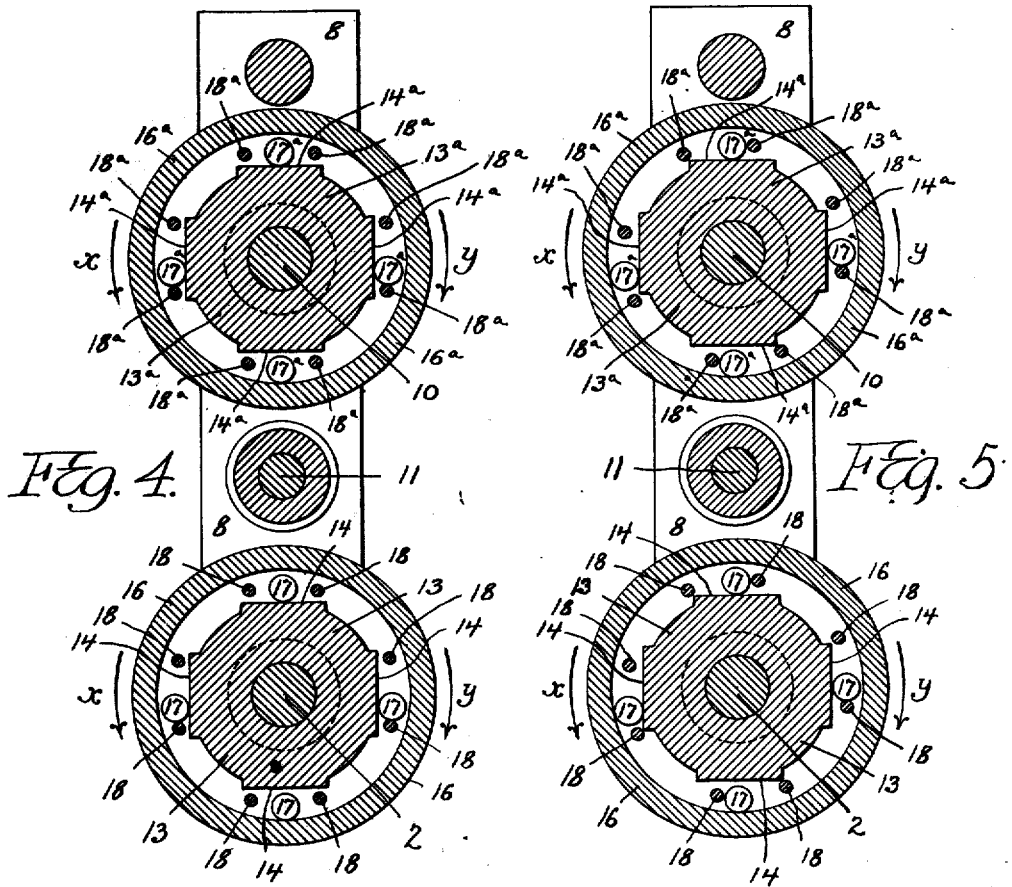
Fig. 4 is a vertical longitudinal sectional view on the line 4—4, Fig. 2, this view illustrating certain elements of the construction in the positions they occupy when the device is adjusted to "neutral" position.
Fig. 5 is a view similar to Fig. 4 but with the parts adjusted to "forward drive" position.

Referring, in the first instance to Fig. 1, there is illustrated a reciprocating head 1 cooperating with a transverse shaft 2. The primary purpose of my invention is to interpose such mechanism between this head 1 and shaft 2 that reciprocation of the head 1 may be caused to drive the shaft 2 in either direction, at will. Other subsidiary purposes will manifest themselves later.

The head 1 is secured to a rod 5, the forward end of which is secured to a swinging handle 6 pivotally mounted at 7 and capable of a swing $a$—$b$. The means whereby swing of the handle 6 is caused to produce continuous rotation of the shaft 2 in either direction will now be described, reference being had to the remainder of the figures of the drawing.

The shaft 2 is mounted in bearings secured to opposite side frames 8, which frames also carry bearings for a supplementary shaft 10 and an intermediate shaft 11.

Loosely mounted upon the shaft 2 is the hub 12 of a disk 13, the periphery of which is provided with one or more contact surfaces 14. Fixedly mounted upon the shaft is the hub of a disk 15, the periphery of which is provided with a flange 16 overlapping the disk 13. Interposed between each contact surface 14 and the flange 16 is a ball or roller 17 adapted to clutch the contact surface 14 to the flange 16 or unclutch it therefrom, each ball or roller 17 (which hereinafter, for convenience, will be referred to as a "ball") being controlled in its relation to the surface 14 by means of a pair of pins 18 which flank it.

Secured to the hub 12 is a spur pinion 19 and with this pinion intermeshes a rack 20 carried by the reciprocating head 1. As this head 1 reciprocates the pinion 19 is oscillated, with consequent oscillation of the disk 13. The pins 18 are mounted upon and project from a disk 21 which is positioned adjacent the disk 13 and which is provided with a hub 22, and to this hub, which is loosely mounted upon the hub 12, is secured a spur pinion 23 with which intermeshes a rack 24 travelling with but adjustable in respect to the rack 20.

The parts 12 to 24, inclusive, constitute the mechanism which serve to create rotary movement of the shaft 2 as a result of reciprocating movement of the head 1 and these parts are duplicated with respect to the shaft 10, that is to say, the parts 12$^a$ and 24$^a$ inclusive, are identical with and function the same as the parts 12 to 24, inclusive.

Figure 6:
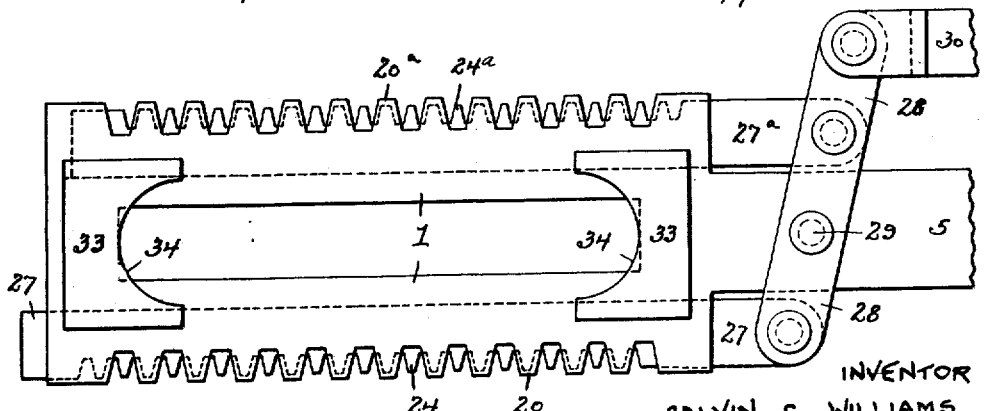
Fig. 6 is a side view of the reciprocating element with its parts adjusted to "forward drive" position.

When the disks 21 and 21ª are adjusted in respect to the disks 13 and 13ª so as to adjust the pins 18 and 18ª in respect to the contact surfaces 14 and 14ª, as shown in Fig. 4, reciprocation of the racks 20 and 24, 20ª and 24ª will cause oscillation of the disks 13 and 13ª but the balls 17 and 17ª will at no time be permitted to jam between the contact faces 14 and 14ª and the flanges 16 and 16ª, consequently there will be no rotation of the latter and the shafts 2 and 10 will stand idle. This is the case when the various racks and pinions occupy the relative positions shown in Fig. 3. When, however, it is desired to rotate the shaft 2 continuously in a forward direction the racks 24 and 24ª are adjusted in respect to the racks 20 and 20ª to the positions shown in Fig. 6. The manner in which this adjustment is effected will be later described.

When such adjustment is effected the pinions 23 and 23ª receive movement of partial rotation in respect to the pinions 19 and 19ª with consequent adjustment of the disks 21 and 21ª in respect to the disks 13 and 13ª. Such change causes adjustment of the pins 18 and 18ª in respect to the contact surfaces 14 and 14ª, as shown in Fig. 5, wherein it will be seen that when the disks 13 and 13ª are rotated in the direction of the arrows $x$ the balls 17 and 17ª will be prevented from jamming against the flanges 16 and 16ª, but when the disks 13 and 13ª are rotated in the direction of the arrows $y$ the said balls will jam between the contact surfaces 14 and 14ª and the flanges 16 and 16ª and will consequently rotate the disks 15 and 15ª in the direction of the arrows $y$, and the shafts 2 and 10 will therefore be rotated in that direction.

On the forward stroke of the actuating racks the disk 13 will be rotated in the direction of the arrow $y$ and the disk 13ª will be rotated in the direction of the arrow $x$ and rotation will be imparted to the shaft 2. On the return or rearward stroke of the actuating racks, the disk 13 will be rotated in the direction of the arrow $x$ and the disk 13ª will be rotated in the direction of the arrow $y$, with consequent rotation of the shaft 10, whereupon it will be seen that the shafts 2 and 10 will now be intermittently and alternately positively rotated.

In order that the rotation of the shaft 2 may be continuous such shaft has mounted upon it a spur pinion 25, a like pinion 25ª being mounted upon the shaft 10 and each of these pinions intermeshing with an intermediate pinion 26 mounted upon the intermediate shaft 11. Owing to this gear train the drive of the shaft 2 is continuous, it receiving its impetus directly upon the forward stroke of the actuating racks and indirectly upon the rearward stroke thereof.

The manner in which the racks 24 and 24ª are adjusted in respect to the racks 20 and 20ª will now be described, particular reference being had to Fig. 1.

The rack 24 is formed upon a bar 27 while the rack 24ª is formed upon a bar 27ª, the forward ends of these bars being pivoted to a lever 28 which is pivotally mounted at 29 to the rod 5. The upper end of this lever is pivoted to the rear end of a link 30, the forward end of which is pivoted to a swinging arm 31 pivotally mounted at 32 to the rod 5 and capable of the swing $m$ $n$.

When the swinging arm 31 is adjusted to the position shown in Fig. 1 the various racks occupy the position shown in Fig. 3, which is "neutral" position and their reciprocation does not cause rotation of either of the shafts 2 or 10. When the arm 31 (Fig. 1) is swung forward to the position $n$ the racks are adjusted to the positions shown in Fig. 6, which is their "forward drive" position and reciprocation of the racks results in the continuous forward drive of the shaft 2 already described.

When it is desired to drive the shaft 2 in the opposite direction the arm 31 (Fig. 1) is swung to its position $m$ which is its "rearward drive" position, and the racks are thereby adjusted to the positions shown in Fig. 8, with resultant adjustment of the pins 18 and 18ª in respect to the contact surfaces 14 and 14ª, as shown in Fig. 7. The drive of the shaft 2 is now reversed from that shown in Fig. 5, that is to say, when the disks 13 and 13ª are rotated in the direction of the arrows $x$ they will be clutched to the flanges 16 and 16ª with consequent rotation of the shafts 2 and 10. When, however, said disks are rotated in the direction of the arrows $y$ they will rotate free from such clutching, consequently on the forward stroke of the actuating racks the shaft 10 will be positively driven in reverse direction and on the rearward stroke of said racks the shaft 2 will be positively driven in reverse direction, with resultant continuous rearward drive of the shaft 2.

When the swinging arm 31 (Fig. 1) is set to "neutral" position the swinging arm 6 may be actuated without any rotation of the shaft 2 whatsoever. When the arm 31 is adjusted to its "forward drive" position actuation of the swinging arm 6 will result in continuous forward drive of the shaft 2. This takes place no matter what degree of actuation is imparted to the swinging arm 6, that is to say, it may be caused to swing through its entire range or its swing may be but a fraction thereof and after rotation of the shaft 2 has been started actuation of the swinging arm 6 may cease, in which case rotation of the shaft 2 will continue until its momentum is exhausted.

When the arm 31 is adjusted to its "rearward drive" position actuation of the swinging arm 6 through any portion of its field of travel will result in continuous rearward drive of the shaft 2.

At times it may be desired to control or stop the rotation of the shaft 2 after the same has been induced, and to effect this each end of the reciprocating head 1 is equipped with a pair of blocks 33, each of which has a concave inner face 34 adapted to bear aginst hubs 35 secured to the intermediate shaft 11.

When the swinging handle 6 is swung to either of its extreme positions and maintained thereat the surfaces 34 of one pair of blocks 33 will be brought into contact with the hubs 35 and will act thereagainst as a brake.

I claim:

1. The combination, in power transmission mechanism, of a shaft, a member secured thereto, a member rotatably mounted thereon, means interposed between said members for releasably clutching them together, a control member for said clutching means, said control member being rotatably mounted upon said shaft, a pinion secured to said rotatably mounted member, a pinion secured to said control member, racks intermeshing with said pinions, and means for simultaneously reciprocating said racks.

2. The combination, in power transmission mechanism, of a shaft, a member secured thereto, a member rotatably mounted thereon, means interposed between said members for releasably clutching them together, a control member for said clutching means, said control member being rotatably mounted upon said shaft, a pinion secured to said rotatably mounted member, a pinion secured to said control member, racks intermeshing with said pinions, means for simultaneously reciprocating said racks, and means for adjusting one of said racks in respect to the other.

3. The combination, in power transmission mechanism, of a shaft, a reciprocating element, releasable clutching means therebetween whereby reciprocation of said element causes said shaft to rotate, and means carried by said element which serves as a brake upon said shaft when said element is maintained in either of its extreme positions.

In testimony whereof I have signed my name to this specification.

CALVIN C. WILLIAMS.